(12) United States Patent
Wilson, I et al.

(10) Patent No.: US 10,926,671 B2
(45) Date of Patent: Feb. 23, 2021

(54) TENSION LIMITING RATCHET MECHANISM

(71) Applicants: Bobby Joseph Wilson, I, Loves Park, IL (US); Paul Terpstra, Janesville, WI (US)

(72) Inventors: Bobby Joseph Wilson, I, Loves Park, IL (US); Paul Terpstra, Janesville, WI (US)

(*) Notice: Subject to any disclaimer, the term of this patent is extended or adjusted under 35 U.S.C. 154(b) by 0 days.

(21) Appl. No.: 16/424,732

(22) Filed: May 29, 2019

(65) Prior Publication Data

US 2019/0366885 A1 Dec. 5, 2019

Related U.S. Application Data

(60) Provisional application No. 62/677,301, filed on May 29, 2018.

(51) Int. Cl.
*B60N 2/28* (2006.01)
*B60P 7/08* (2006.01)

(52) U.S. Cl.
CPC ............ *B60N 2/2806* (2013.01); *B60P 7/083* (2013.01); *B60P 7/0861* (2013.01)

(58) Field of Classification Search
CPC .......... B60N 2/2806; B60N 2002/2815; B60P 7/0823; B60P 7/083; B60P 7/0846; B60P 7/0861; Y10T 24/21; Y10T 24/2113; Y10T 24/2117; Y10T 24/2121; Y10T 24/2175

See application file for complete search history.

(56) References Cited

U.S. PATENT DOCUMENTS

| | | | |
|---|---|---|---|
| D471,727 S | 3/2003 | King et al. | |
| D487,640 S | 3/2004 | Chen | |
| 7,950,629 B2 | 5/2011 | Mamié | |
| D682,563 S | 5/2013 | Goldberg | |
| D683,142 S | 5/2013 | Goldberg | |
| D697,323 S | 1/2014 | Williams et al. | |
| 8,827,364 B2 * | 9/2014 | Banghart | B60N 2/2863 297/250.1 |
| D727,037 S | 4/2015 | Naslain et al. | |
| D746,072 S | 12/2015 | Haley | |
| 2008/0104811 A1 * | 5/2008 | Burrows | B60P 7/083 24/68 CD |
| 2013/0025098 A1 | 1/2013 | Smith | |
| 2013/0333169 A1 | 12/2013 | Durand | |

* cited by examiner

*Primary Examiner* — Sang K Kim
*Assistant Examiner* — Nathaniel L Adams

(57) ABSTRACT

The present disclosure provides a new method and apparatus for a ratchet tensioning mechanism. The apparatus uses a spring release mechanism to limit the torque applied via the tensioning device to a predetermined level. In an alternative configuration the limit of the tension could be adjusted by the user.

7 Claims, 2 Drawing Sheets

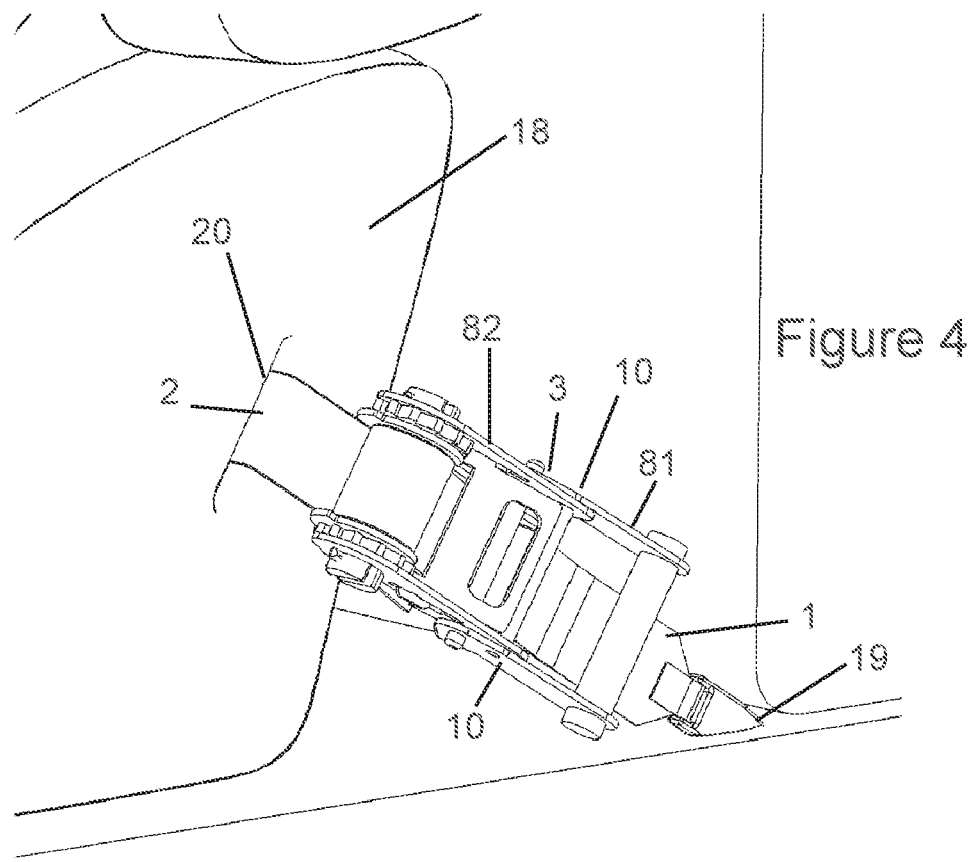
Figure 4
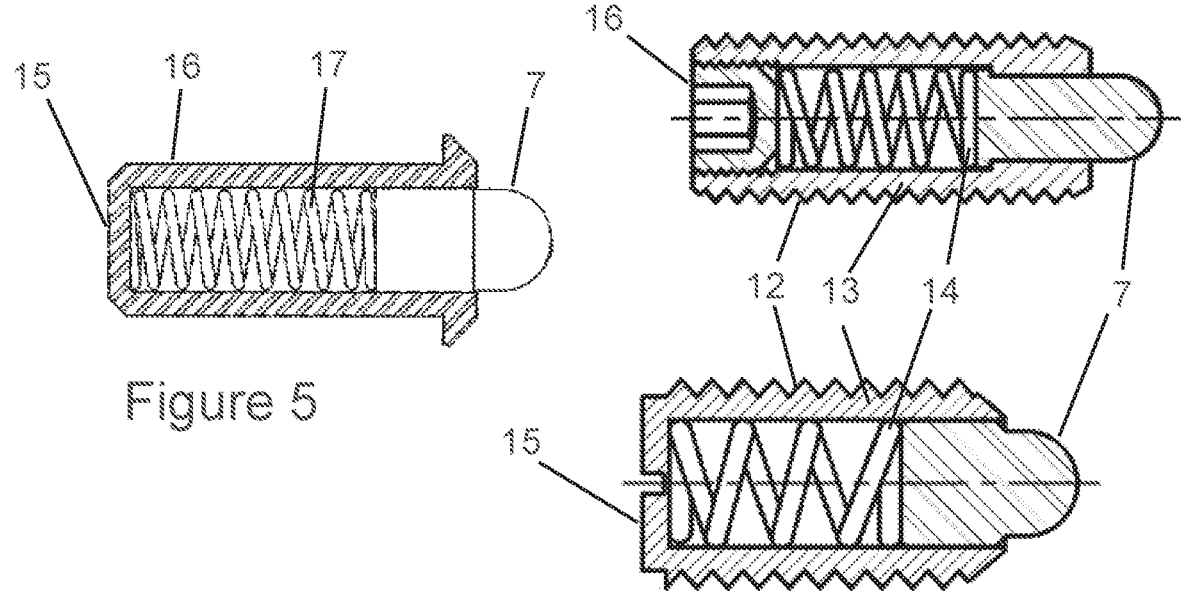
Figure 5
Figure 6
Figure 7

TENSION LIMITING RATCHET MECHANISM

CROSS REFERENCE TO RELATED APPLICATIONS

This application claims priority to provisional patent application Ser. No. 62/677,301 filed on 29 May 2018 the disclosure of which is hereby incorporated by reference.

FIELD OF THE INVENTION

The invention relates to a ratcheting mechanism for ratchet straps, or similar devices, that limits the tension applied to a predefined level.

BACKGROUND OF THE INVENTION

Tie down straps (also called ratchet straps, lashing straps or tie downs) are fasteners used to restrain cargo or equipment during transport on trucks, trailers, and to a variety of platforms. They are essentially a web, or strap with an attachment feature, such as a hook, on each end along with some type of tensioning device.

The tensioning device can be as simple as passing the strap under a wedging block the only allows the strap to be pulled in one direction. The tension is applied by the installer pulling on the strap in the allowed direction. The amount of tension is limited to the amount of tension that the installer can apply.

Alternatively, the tensioning device is often a ratcheting mechanism. One end of the device has a fixed length. The other end is the free end that is wound and unwound from the spool anchored by the fixed end. The ratchet mechanism provides a spool on a transverse axis with unidirectional teeth and a catch pawl. The free end of the strap wraps around the spool but can only rotate under tension in one direction as the pawl engages successive teeth and prevent rearward rotation. A manual release disengages the drive from engagement with the spool teeth and allows the spool to turn backwards and unwind strapping on the spool. Ratcheting tie down assemblies are disclosed in U.S. Pat. Nos. 2,442,266; 3,175,806; 3,180,623; 4,155,537; 4,268,012; 4,527,309; 4,913,608; 5,855,045; 6,007,053; 7,950,629; 9,162,905; and 9,656,591 and US Publication nos. 203/0025098 and 2013/0333169, the disclosures of which are hereby incorporated by reference.

A lever arm that engages the spool is used to turn the spool and provide a mechanical advantage, so a large amount of tension can be applied by nearly any user. The cargo that is being restrained, however, can often be crushed. In addition, it is possible that putting too much tension on the strap can cause damage to the structure that the cargo is being anchored to.

A number of securing systems have suggested the use of ratcheting tie down assemblies for use with adolescent car seats. For example, U.S. Pat. No. 6,047,451 works with existing seat belts to wind up excess belt. See also U.S. Pat. Nos. 6,241,174 and 6,247,208.

U.S. Pat. No. 8,434,821 discloses a car seat having an integrated ratchet system in the base portion with an indicator of the tension applied by the ratcheting strap system.

U.S. Pat. No. 7,159,948 describes a car seat restraint system that includes a tension gauge showing the tension forces on the restraining straps.

SUMMARY OF THE INVENTION

The present disclosure provides a new method and apparatus for a ratchet tensioning mechanism. The apparatus uses a spring release mechanism to limit the torque applied via the tensioning device to a predetermined level. In an alternative configuration the limit of the tension could be adjusted by the user.

In an example embodiment, the handle used to apply tension to the ratcheting mechanism is separated into two parts. The first, lower, drive part is connected to the spool and applies the tensioning drive to the strap winding mechanism. A manual release lever allows the drive mechanism to disconnect from the ratchet spool to allow wound strap to be unwound.

The second, upper, outer part of the handle (further from the pivot) is pivotally attached to the first part and secured in a releasable, rotation movement with the first, lower, drive part with a spring-biased, release mechanism.

Stop tabs are included in the second, outer part of the handle to stop the rotation of the second part in relation to the first part. These stop tabs allow the handle to be used to release the tension of the ratchet mechanism after the spring mechanism has allowed the initial motion between the two parts.

In the preferred embodiment, the spring release mechanism is made up of two opposing spring-biased plungers located in opposite directions with the plungers mating to holes formed in the second, movable portion of the handle when in the normal operating position. Preferably, the spring-biased plungers are located parallel to the winding axis in the first, lower, drive portion of the ratchet handle. Holes in the second, upper, outer part of the handle are formed in positions that will releasably engage the terminal ends of each corresponding spring plunger. When the preset tension level is exceeded, the spring plungers slip out of engagement with the mated holes and prevent overtightening.

In an alternative embodiment, the spring force applied to the plungers is adjustable by the operator to set the desired tension level at which the handle will be released. This would allow the operator to adjust the tension applied by the ratcheting mechanism and thereby increase the flexibility and additional uses for the present invention.

The tensioning device of the invention could be used for any size of ratchet strap used to restrain cargo or apply a pulling force between two objects.

In one embodiment, the tensioning device of the present invention is used with a child's car seat or car seat base installed in an automobile seat. Vehicles after model year 2003 are required to have lower anchor (metal U-shaped bars hidden in juncture between the bottom and rear seating surfaces) in at least two seating positions and tether anchors (a ring or bar behind the vehicle seat) in at least three positions. This means that, in most vehicles, the rear side seats have lower anchors and tether anchors while the rear center seat has a tether anchor but no tethers.

Installing a child's car seat requires the installer secure a strap to the car seat base or behind the car seat and apply the proper tension. This task can be very difficult to do properly, and child seats are often not tensioned to the proper level. By using a preset tension point for the assembly of the present invention, each connection can be made properly on a consistent basis.

The proposed ratchet mechanism would use a short ratchet strap that would be used to restrain the child seat between appropriate anchors and/or tethers. Commercially available retention clips attached on both ends (the fixed end and the free end) of the tensioning assembly creates a system that would apply the proper, predetermined tension to secure the car seat in the vehicle. This would insure that the car seat is properly secured without damaging the car seat or the automobile's retaining clips. A preferred, basic, ratcheting tie down strap assembly is shown in U.S. Pat. No. 7,950,629 with a handle that has been modified according to the present invention.

BRIEF DESCRIPTION OF THE FIGURES

FIG. 4 depicts the assembly when installed in a vehicle to restrain a car seat between adjacent anchor positions in a vehicle.

FIG. 5 is a press-fit, spring-biased plunger of a fixed biasing force and terminal detent.

FIG. 6 shows an adjustable, spring-biased plunger and terminal detent.

FIG. 7 illustrates a different type of adjustable, spring-biased plunger and terminal detent.

DETAILED DESCRIPTION OF THE INVENTION

Figure 1:
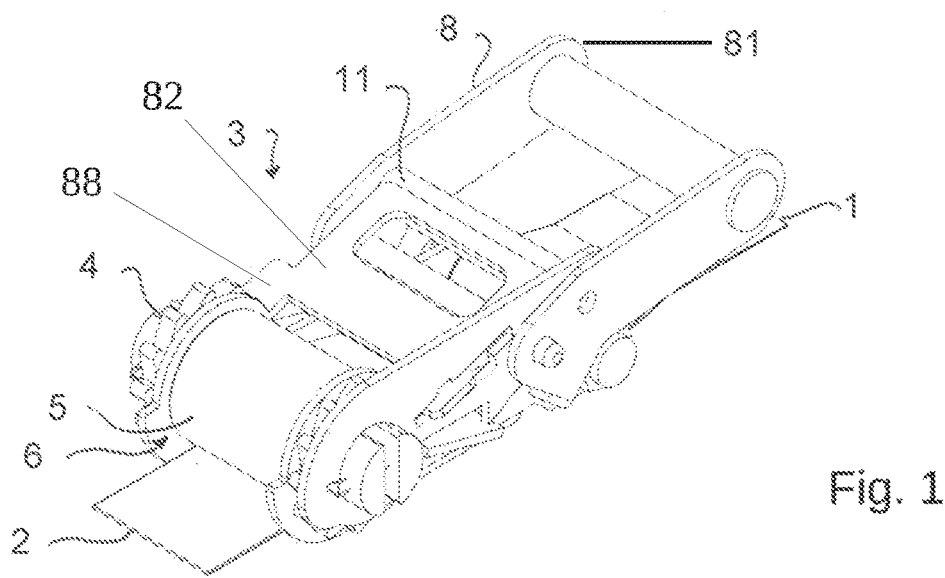
FIG. 1 shows a cross section view of a ratchet and adjustable tension handle according to the invention.
Figure 2:
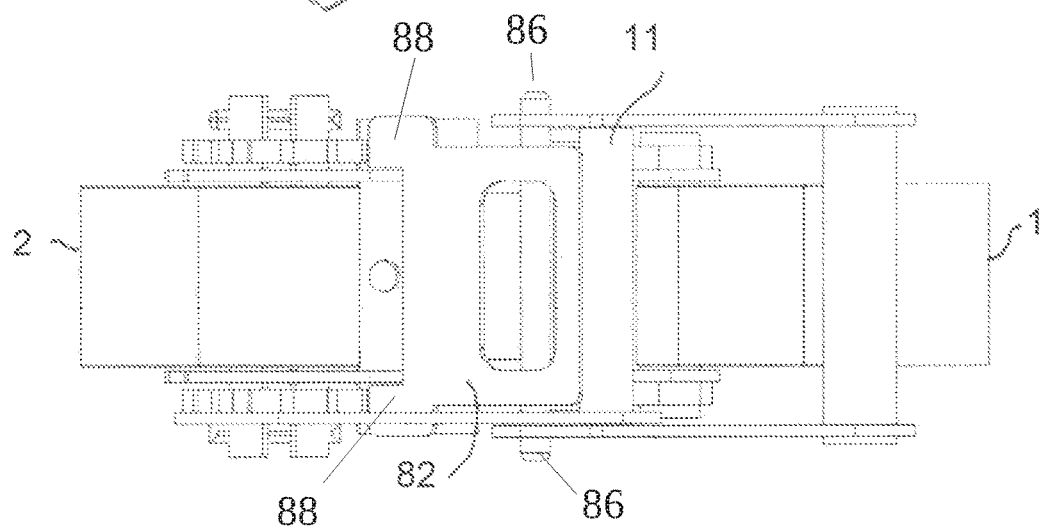
FIG. 2 illustrates a tension-limiting ratchet from the ratchet free end view.

The tension-limiting ratchet described herein is created by dividing a conventional ratchet tensioning handle into two sections that are pivotably connected with a spring-biased, adjustable, release detent. The adjustable release is threaded to move from a first handle section towards or away from a recess in the second handle section. The position of the release detent thus controls the amount of force allowed when tightening the ratchet while winding a strap onto the rotated reel. When properly set, the release detent prevents too much or too little tension to be applied to the strap that holds in the car seat and thereby produces a more consistent and reliable installation.

The first section of the ratchet is the lower part of the handle that is positioned inside an upper part of the handle. This lower, inner handle portion carries the pawl mechanism that interacts with notches associated with the spool to wind strapping onto the central spool about a winding axis. This section operates like a conventional ratchet.

The second section is attached to the first section in a manner that allows the second section to pivot about a pivot located near the end of the first section. A spring release mechanism is used to tie the motion of the two sections together until a predetermined amount of force (torque) is applied to the second section of the handle.

A preferred embodiment of the spring release mechanism has two plungers located within the lower, first section of the handle and extends between left and right plates on the upper, second handle section. It will be understood that a single, double-ended detent can replace the use of two, single detent plungers. Each plunger has one spring-biased, rounded end that presses outwardly towards the side plates on the upper, outer, second section of the handle.

The second section of the handle is positioned outside of the lower, inner handle portion and contains holes that line up with the plungers when the first and second sections are in an operating position to wind up a strap on a reel in the lower, first section. The plungers are forced outward against the outer plates of the upper second section of the handle by springs within plungers. The amount of force applied by the springs to the plungers can be either fixed or adjustable.

If desired, the openings that engage the spring-biased detents may be reinforced to resist wear or premature failure. For example, a hardened steel insert on the inside of the handle side plates may be used around the recess openings. Alternatively, some portion or all of the disengageable handle might be heat treated to a hardness at least as high as that of the detent and thereby help to resist wear from repeated use.

Those skilled in this art will appreciate that the relative positions of the upper and lower handle sections may be reversed such that the lower handle portion has recesses for the detents and is positioned outside the upper handle portion that carries the spring-biased plunger.

One method of adjusting the spring force within the detent would be to use a jack-screw type of mechanism pushing on the rear of the springs. A second method would be a self-contained spring plunger that threads into a tube with a female thread. The detent would then be advanced or retracted using the external threads to adjust the spring force by its proximity to the associated recess or hole in the second section.

The plungers used in the present invention can be externally threaded or press fit. The use of external threads allows for adjustment, while the press fit plunger provides a manufacturer with the ability to set the desired break release torque.

Tabs on the second, outside section of the handle limit the amount that the section can rotate once it has been released by the spring mechanism. Once these tabs reach the first, inner section of the handle the ratchet can be rotated enough to release the retaining, or counter-rotation mechanism.

As shown in the figures, the child seat retention system is created by attaching two standard child seat clips 19 to the fixed and free strap ends 1, 2 of the tension limiting ratchet strap assembly 3. The ratchet 4 is turned to wind excess strap 5 onto the spool 6 with ratchet handle 8 of strap assembly 3. Handle 87 is made in two parts, such as with an upper portion and a lower portion as illustrated by outer handle portion 81 and inner handle portion 82, that are releasably retained together through spring-biased plunger detent 7 extending from inner handle portion 82 outwardly towards a recess 9 in outer handle portion 81. Inner handle portion 82 engages the pawls in ratchet 42 with extended portions 88 during a winding operation until sufficient tension has been applied to strap end 1 that the tension force exceeds the retaining forces of the spring-biased plunger detents 7. When that tension is exceeded, the plunger detents 7 will slip free from the recesses 9 in the outer handle plates 10 and cause outer handle portion 81 to rotate about transverse pivot pin 86 thereby preventing the application of additional force on the strap 5. Inner handle portion 82 can be manually pulled away from engagement with ratchet 4 to release tension on strap ends 1, 2.

Figure 3:
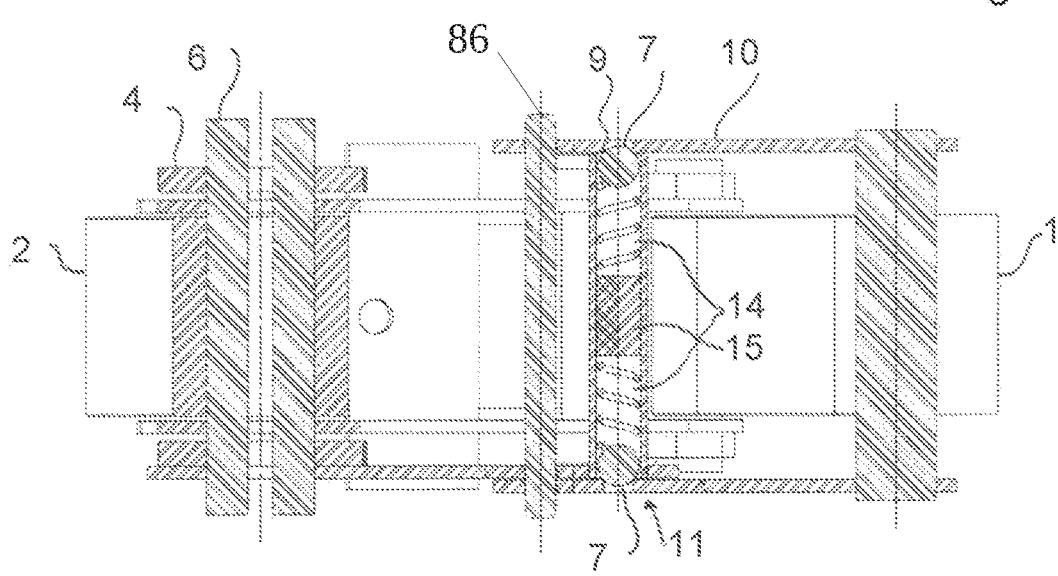
FIG. 3 illustrates a tension-limiting ratchet from the top view.

FIGS. 3 and 5-7 show additional details of the spring-biased plunger assembly 11. As shown in FIGS. 3, 6, and 7 assembly 11 can exhibit external threads 12 in plunger body 13. Alternatively, press-fit plunger 16 can be inserted into either end of a plunger assembly and used with fixed spring 17 of a specified bias force. Such an embodiment would not be adjustable and would allow the manufacturer to specify the minimum amount of torque needed for securing a car seat 18 to structural seat engaging points 19 within a vehicle.

Internal springs 14 press against fixed stops 15 or adjustable stop 16 and urge detents 7 outwardly into engagement with recesses 9 in the left and right lateral plates 10 of outer handle portion 81 of handle 8. At an adjustable level of shear based on the bias force of springs 14, 17 detents 7 slip out of recesses 9 and allow outer handle portion 81 to rotate about pivot pin 86 without further turning ratchet 4 and spool 6. The precise level of this breakaway shear depends on the compressive strength of springs 14, 17.

The present invention is particularly useful for securing a child's car seat 18 in a vehicle with a specified amount of tension on the restraining straps. As shown in FIG. 4, the strap free end 2 is threaded from the right side of seat 18 through opening 20 and secured on the opposite side to the seat belt connection or suitable structural attachment point (not shown). The strap fixed end is secured to a seat belt connector or standard seat clip 19 that is secured to a suitable structural attachment point (not shown) behind the seat cushion. Outer ratchet handle portion 81 moves with inner ratchet handle portion 82 through the engagement of detents 7 with recesses 9 in lateral plates 10 as the strap is wound onto spool 6 as extended portions 88 of the inner handle portion 82 engage and turn ratchet 4 and spool 6. When the amount of torque applied to outer handle portion 81 exceeds the biasing force against the lateral plates 10 of the outer handle portion 81, the detents 7 slip from the recesses 9 and release the outer handle portion 81 from engagement with the lower handle portion. By this mechanism, a consistent level of torque can be assured if the installer consistently tightens the ratchet to its breakaway tension.

What is claimed is:

1. In a strap ratchet mechanism having a handle assembly that winds a strap around a transverse spool connected to a ratchet wheel having a plurality of anti-reverse pawls, the improvement comprising: a handle assembly having a first, inner portion, a releasably engaged second, outer portion, and a spring-biased plunger assembly extending between the outer handle portions that connects the inner and outer handle portions when winding said strap but will disconnect the inner and outer handle portions upon reaching a preselected tension level in said strap, whereby the handle comprises:

an inner handle portion (82) mounted so it pivots around a transversely mounted ratchet wheel (4) and engages said ratchet, said inner handle portion (82) further comprising (i) a transversely mounted pivot pin (86) at a distal position from the ratchet wheel (84) and (ii) the plunger assembly comprising two spring-biased plungers (16) that are oriented parallel to said pivot pin (86) and that urge a terminal detent (7) of each plunger outwardly from said inner handle portion into engagement with a hole aligned with said plunger in an outer handle portion, wherein said plunger assembly comprises internal springs (14) that press against fixed stops (15) or an adjustable stop (16) and thereby urge the detents (7) outwardly;

an outer handle portion that pivots about said pivot pin and that spans across the inner handle portion at said pivot pin, wherein said outer handle portion includes first and second side plates on either side of said pivot pin and a transverse operator handle spanning a distance between the side plates opposite said pivot pin, wherein each said side plate has the holes that align with the detents of the spring plunger assembly when said outer handle portion is in an engaged position relative to said inner handle portion, wherein at least one detent from the inner handle portion disengages from its corresponding hole on said outer handle portion upon reaching a preset torque applied to said outer handle portion that is related to a preselected strap tension.

2. A ratchet mechanism according to claim 1 wherein said handle comprises two spring-biased plungers that share a common spring inside the plunger.

3. A ratchet mechanism according to claim 1 wherein said handle comprises two spring-biased plungers, each having a spring inside each plunger.

4. A ratchet mechanism according to claim 1 wherein the biasing force on each detent is adjustable in biasing force.

5. A ratchet mechanism according to claim 1 wherein the biasing force on each detent is not adjustable in biasing force.

6. A support seat retention kit comprising a juvenile support seat, a length of strap, and the ratchet mechanism of claim 1.

7. A process for securing a juvenile support seat in a motor vehicle with a tension-limiting ratchet having (i) a length of strap extending from a fixed strap end and (ii) a free strap end allowing access to a winding spool driven by a handle, the process comprising:

attaching a terminal end of said fixed end strap to a first connection point in a vehicle;

connecting a terminal end of a connection strap to a second connection point in said vehicle and feeding said connection strap into said winding spool;

winding said connection strap onto said winding spool by repeatedly advancing and withdrawing the handle to selectively rotate said spool by engaging and disengaging pawls driving said winding spool;

winding the connection strap onto said spool until the tension-limiting handle of said ratchet disengages upon reaching a preselected tension level in said connection strap; wherein said tension-limiting ratchet comprises:

a handle assembly having a first, inner portion, and a releasable engaged second, outer portion, and a spring-biased plunger assembly extending between the outer handle portions that connects the inner and outer handle portions when winding said strap but will disconnect the inner and outer handle portions disengage upon reaching a preselected tension level in said strap, whereby the handle comprises:

an inner handle portion (82) mounted so it pivots around a transversely mounted ratchet wheel (4) and engages said ratchet, said inner handle portion (82) further comprising (i) a transversely mounted pivot pin (86) at a distal position from the ratchet wheel (84), and (ii) a plunger assembly comprising two spring-biased plungers (16) that are oriented parallel to said pivot pin (86) and that urge a terminal detent (7) of each plunger outwardly from said inner handle portion into engagement with a hole aligned with said plunger in an outer handle portion, wherein said plunger assembly comprises internal springs (14) that press against fixed stops (15) or an adjustable stop (16) and thereby urge the detents (7) outwardly;

an outer handle portion that pivots about said pivot pin and that spans across the inner handle portion at said pivot pin, wherein said outer handle portion includes first and second side plates on either side of said pivot pin and a transverse operator handle spanning a distance between the side plates opposite said pivot pin, wherein each said side plate has the holes that align with the detents of the spring plunger assembly when said outer handle portion is in an engaged position relative to said inner handle portion, wherein at least one decent from the inner handle portion disengages from its corresponding hole on said outer handle portion upon reaching a preset torque applied to said outer handle portion that is related to a preselected strap tension.

\* \* \* \* \*